US012693817B2

(12) United States Patent (10) Patent No.: US 12,693,817 B2
Tanaka (45) Date of Patent: Jul. 28, 2026

(54) SYSTEM, MANAGEMENT SERVER, AND CONTROL METHOD FOR MANAGEMENT SERVER

(71) Applicant: CANON KABUSHIKI KAISHA, Tokyo (JP)

(72) Inventor: Yuya Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 269 days.

(21) Appl. No.: 18/655,899

(22) Filed: May 6, 2024

(65) Prior Publication Data

US 2024/0378001 A1 Nov. 14, 2024

(30) Foreign Application Priority Data

May 8, 2023 (JP) ................................. 2023-076459

(51) Int. Cl.
| | |
|---|---|
| *G06F 3/12* | (2006.01) |
| *G06Q 10/083* | (2023.01) |
| *G03G 15/08* | (2006.01) |
| *G03G 15/20* | (2006.01) |

(52) U.S. Cl.
CPC .......... *G06F 3/1235* (2013.01); *G06F 3/1204* (2013.01); *G06F 3/121* (2013.01); *G06F 3/1287* (2013.01); *G06Q 10/083* (2013.01); *G03G 15/0867* (2013.01); *G03G 15/0875* (2013.01); *G03G 15/205* (2013.01)

(58) Field of Classification Search
None
See application file for complete search history.

(56) References Cited

U.S. PATENT DOCUMENTS

| | | | |
|---|---|---|---|
| 7,161,700 B2 * | 1/2007 | Nunokawa .......... | H04L 41/5054 709/224 |
| 2002/0049839 A1 * | 4/2002 | Miida ................. | G06F 11/3013 709/224 |
| 2017/0063646 A1 * | 3/2017 | Kawai .................... | G06Q 10/10 |
| 2019/0291452 A1 * | 9/2019 | Yada .................... | B41J 2/17566 |
| 2021/0197603 A1 * | 7/2021 | Tanaka ................. | G06Q 10/087 |

FOREIGN PATENT DOCUMENTS

JP 6651744 B2 2/2020

* cited by examiner

*Primary Examiner* — Haris Sabah

(74) *Attorney, Agent, or Firm* — Canon U.S.A., Inc. IP Division

(57) ABSTRACT

A management server configured to communicate with a printer to which an ink cartridge integrated with a print head is attached, the management server is configured to determine, when the management server receives a notification about a print head error including an ink cartridge identifier of the ink cartridge with which the print head error has occurred from the printer, an ink cartridge type based on the ink cartridge identifier included in the notification and a storage, and execute, in a case where the ink cartridge with which the print head error has occurred is an ink cartridge integrated with a print head under a predetermined contract, processing for delivering a replacement of the ink cartridge.

9 Claims, 10 Drawing Sheets

```
{
601～  "serialNumber": "AAAA11111",
602～  "model": "ABCZ series",
603～  "inkType": "A"
       "inkStatus": [
           {
604～       "color": "Color",
605～       "model": "ABC-<CL>",
606～       "level": "80",
607～       "id": "CRG000001",
608～       "tankinfo": "002"
           },
           {
             "color": "Black",
             "model": "ABC-<BK>",
             "level": "90",
             "id": "CRG000002",
             "tankinfo": "002"
           }
       ]
}
```

```
{
601～  "serialNumber":
       "AAAA11111",
602～  "model": "ABCZ series",
611～  "errorcode": "xxx0001",
612～  "errorstatus": "head error",
613～  "additional info": {
           "id": "CRG000001"
       }
}
```

| PRINTER | SERVICE | INK SHAPE |
|---------|---------|-----------|
| PR00001 | UNDER CONTRACT | PRINT HEAD INTEGRATED TYPE |
| PR00002 | UNDER CONTRACT | INDEPENDENT TYPE |

| CARTRIDGE ID | CARTRIDGE TYPE | MODEL NUMBER |
|--------------|----------------|--------------|
| CRG00001 | DEDICATED | ABC – <CL> |
| CRG00002 | DEDICATED | ABC – <BK> |
| CRG00003 | COMMERCIALLY AVAILABLE | XXX – <CL> |

| CARTRIDGE ID | MODEL NUMBER | AMOUNT OF REMAINING INK | PRINT HEAD ERROR | REPLACEMENT DELIVERY |
|---|---|---|---|---|
| CRG00001 | ABC – <CL> | 80 | — | DONE |
| CRG00002 | ABC – <BK> | 90 | — | NOT YET |

| PRINTER ID | USER ID | E-MAIL ADDRESS | DELIVERY DESTINATION |
|---|---|---|---|
| PR00001 | USER00001 | user1@mail.com | xx-xx Ota-ku, Tokyo |
|  |  |  |  |
|  |  |  |  |

SYSTEM, MANAGEMENT SERVER, AND CONTROL METHOD FOR MANAGEMENT SERVER

BACKGROUND

Field

The present disclosure relates to a system, a management server, and a control method for the management server, related to a print service.

Description of the Related Art

In recent years, flat-rate print services have been widely provided to users who use image forming apparatuses. A flat-rate print service is also called a subscription service, which is a service that can be subscribed to for an individual image forming apparatus. In general, with a flat-rate print service in use, a consumable item dedicated to the flat-rate printing service is often ordered periodically for the image forming apparatus under contract.

Japanese Patent No. 6651744 discloses a technique for shipping a replacement cartridge of a specific type to a user based on the remaining amount of the recording agent in a cartridge of the type.

However, the technique of sending a cartridge based on the remaining amount of the recording agent as in Japanese Patent No. 6651744 has an issue that a replacement cartridge is not ordered when the print head with which an ink cartridge is integrated has failed whereas the amount of the remaining ink is not equal to or lower than a threshold.

SUMMARY

According to an aspect of the present disclosure, a system includes a printer to which an ink cartridge integrated with a print head is attached and a printer management server. The printer is configured to transmit status information including an ink cartridge identifier and an ink cartridge type of the attached ink cartridge to the printer management server, and issue, when a print head error with the attached ink cartridge occurs, a notification about the print head error including the ink cartridge identifier to the printer management server. The printer management server includes a storage, one or more memories storing instructions, and one or more processors capable of executing the instructions. The instructions cause the management server to store, when the printer management server receives the status information from the printer, a printer identifier, the ink cartridge identifier, and the ink cartridge type in association with each other in the storage, determine, when the printer management server receives the notification about the print head error from the printer, the ink cartridge type based on the ink cartridge identifier included in the notification and the storage, and execute, in a case where the ink cartridge with which the print head error has occurred is an ink cartridge integrated with a print head under a predetermined contract, processing for delivering a replacement of the ink cartridge.

Further features of the present disclosure will become apparent from the following description of exemplary embodiments with reference to the attached drawings.

BRIEF DESCRIPTION OF THE DRAWINGS

FIGS. 6A and 6B are diagrams each illustrating an example of status information according to the present exemplary embodiment.

FIGS. 7A and 7B are diagrams illustrating tables stored in a database of the printer management server of the present exemplary embodiment.

FIG. 9 is an order management table according to the second exemplary embodiment.

FIG. 10 is a user management table stored in a database of a store server according to the present exemplary embodiment.

DESCRIPTION OF THE EMBODIMENTS

Hereinafter, exemplary embodiments of the present disclosure will be described in detail with reference to the accompanying drawings. The following embodiments do not limit the present disclosure according to the scope of claims, and not all combinations of features described in the embodiments are used in solution in the present disclosure.

<Configuration of Information Processing System>

Figure 1:
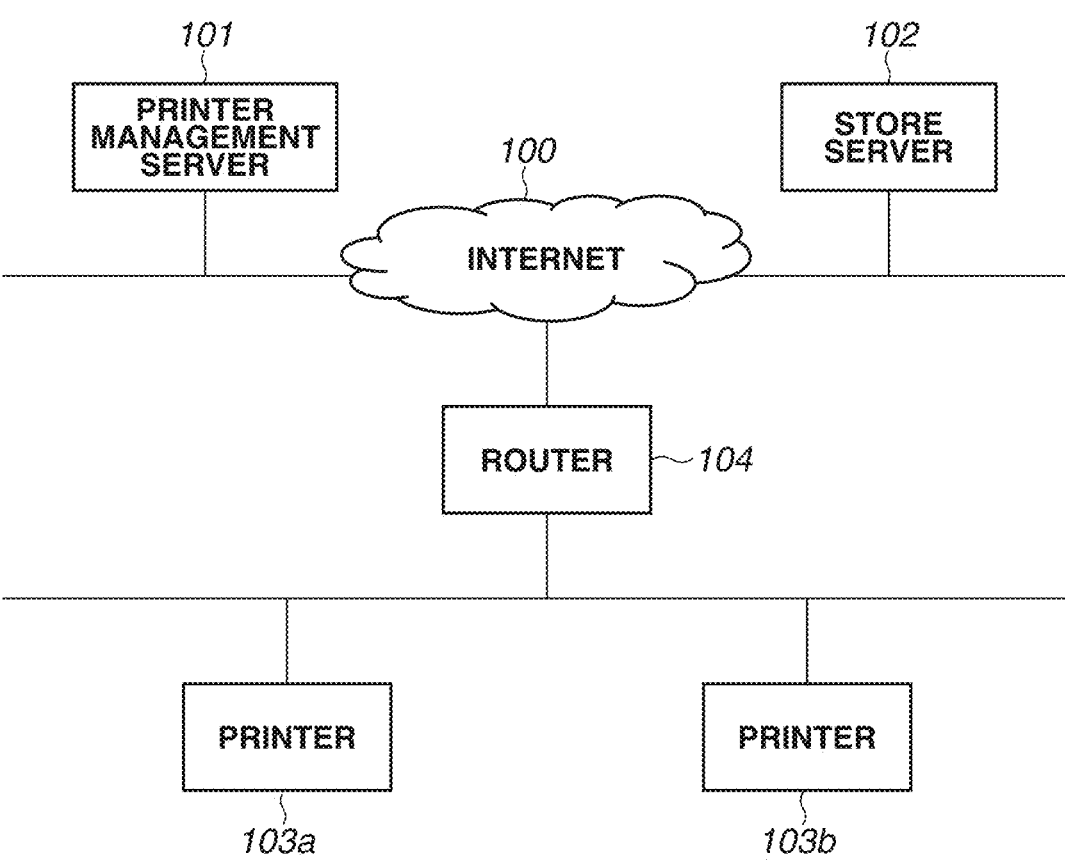
FIG. 1 is a diagram illustrating an example of the configuration of a consumable item ordering system according to a first exemplary embodiment.

FIG. 1 is a diagram illustrating an example of the configuration of a consumable item ordering system according to a first exemplary embodiment of the present disclosure.

As illustrated in FIG. 1, the consumable item ordering system according to the present exemplary embodiment includes a printer management server 101, a store server 102, and printers 103 (103a and 103b) as image forming apparatuses (recording apparatuses). The configuration of the consumable item ordering system according to the present exemplary embodiment will be described with reference to FIG. 1.

The printers 103 are a printer 103a to which an ink cartridge integrated with a print head is attached and a printer 103b to which an ink cartridge not including a print head (an independent type ink cartridge) is attached. When simply described as the printer 103, the printer 103 is any one of the printers 103, the printer 103a or the printer 103b.

Each of the printers 103 is a printer that can be used both when a user uses the printer without concluding a contract with a service provider and when a user uses the printer with a contract concluded with a service provider. In the following description, a state in which a user uses a printer without concluding a contract with a service provider is referred to as a "normal use state", and a state in which a user uses a printer with a contract concluded with a service provider is referred to as a "use-under-contract state". As an example, the service is assumed to be a "flat-rate print service".

A flat-rate print service is a service that allows use of "flat-rate print", as an example of printing under contract, at a flat rate specified in the contract terms within the range of the usage period and the upper limit number of sheets for printing specified in the contract terms. For example, the flat-rate print service provides a user with consumable items and/or replacements to be used for flat-rate printing at the flat rate within the range that does not exceed the usage period and the upper limit number of sheets as described above. That is, in response to when the amount of the remaining recording agent in a dedicated cartridge attached to a printer with the contract of the flat-rate print service concluded is equal to or lower than a threshold, another cartridge dedicated to the contract is automatically delivered. In the case of a dedicated cartridge integrated with a print head, a cartridge dedicated to the contract is automatically delivered also in response to the occurrence of an error with the print head of the cartridge.

The printer management server 101 and the store server 102 are each connected to the Internet 100. The printers 103 are connectable to the Internet 100 via a router 104.

The printer management server 101 manages information transmitted from the printers 103, and information transmitted from the printer 103a and/or the printer 103b in the use-under-contract state can be provided to the store server 102 via the Internet 100.

Individual communications are controlled through Hyper Text Transfer Protocol (HTTP) or Extensible Messaging and Presence Protocol (XMPP). The protocols are not limited to these, and in some embodiments, other protocols are used.
<Configuration of Server>

Figure 2:
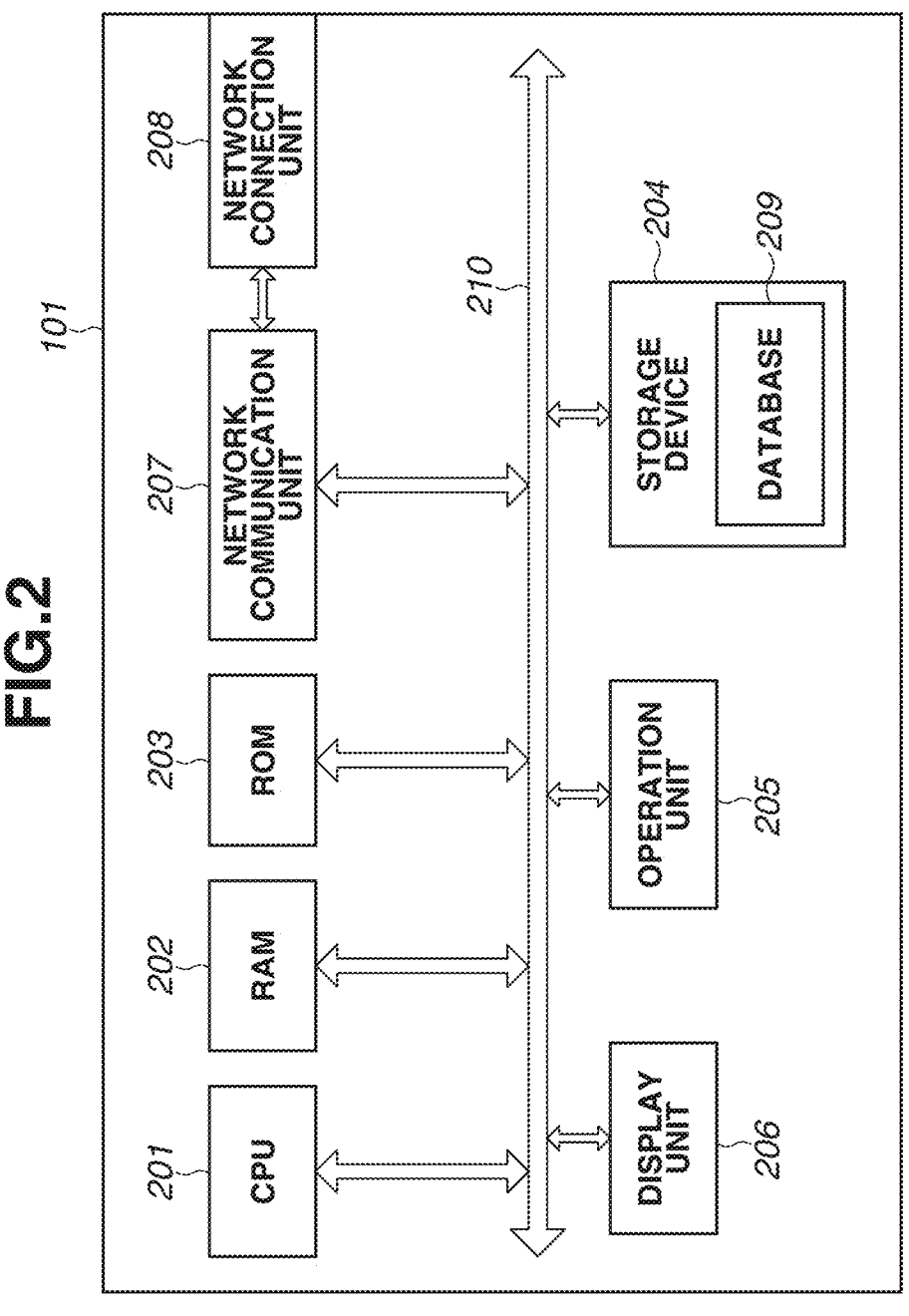
FIG. 2 is a block diagram illustrating an example of a hardware configuration of a printer management server according to the present exemplary embodiment.

FIG. 2 is a block diagram illustrating an example of a hardware configuration of the printer management server 101. The configuration of the printer management server 101 according to the present exemplary embodiment will be described with reference to FIG. 2.

The printer management server 101 includes a central processing unit (CPU) 201, a random-access memory (RAM) 202, a read-only memory (ROM) 203, a storage device 204, an operation unit 205, a display unit 206, a network communication unit 207, and a network connection unit 208.

The CPU 201 is a central processing unit for controlling the units of the printer management server 101. The RAM 202 serves as a work memory when the CPU 201 runs programs. The ROM 203 is a read-only memory for storing boot programs used in system activation. The storage device 204 is a device for storing programs to be run by the CPU 201, a database 209, or various kinds of information, and is a non-volatile storage device, such as a magnetic disc or a flash memory.

The operation unit 205 includes a keyboard, a mouse, and others for a user to perform various input operations. The display unit 206 includes, for example, a liquid crystal display (LCD) that displays various kinds of information to be presented to a user. The network communication unit 207 is connected to networks, such as the Internet 100, via the network connection unit 208, to perform various types of communication.

The above-described units are connected to each other via a bus 210 to transmit and receive data to and from each other.

The store server 102 has the same hardware configuration as the printer management server 101, and the description thereof will be omitted. However, the store server 102 may have a hardware configuration different from that of the printer management server 101.

In FIG. 2, the description will be given of an example in which the printer management server 101 is one server (information processing apparatus), but the printer management server 101 may be composed of a plurality of servers.

That is, the plurality of servers may operate in cooperation with each other to carry out functions. The printer management server 101 may be implemented using the cloud computing technology. The store server 102 may also be composed of a plurality of servers. In the present exemplary embodiment, a configuration composed of one server or a plurality of servers is referred to as a server system.
<Hardware Configuration of Printer>

Figure 3:
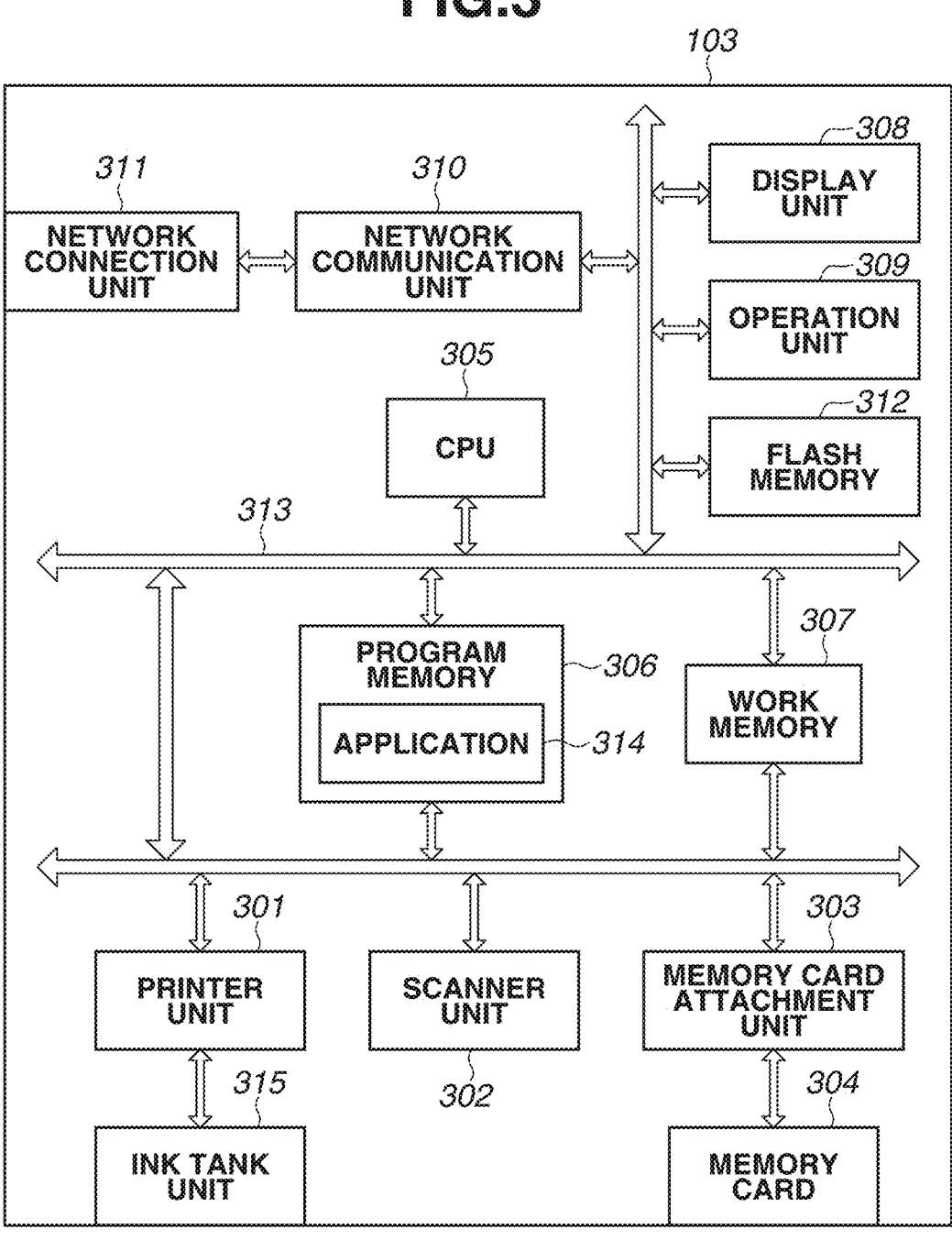
FIG. 3 is a block diagram illustrating an example of a hardware configuration of each printer according to the present exemplary embodiment.

FIG. 3 is a block diagram illustrating an example of a hardware configuration of each of the printers 103. The configuration of each of the printers 103 according to the present exemplary embodiment will be described with reference to FIG. 3.

Each of the printers 103 includes a printer unit 301, a scanner unit 302, a memory card attachment unit 303, a memory card 304, and an ink tank unit 315. Each of the printers 103 also includes a CPU 305, a program memory 306, a work memory 307, a display unit 308, an operation unit 309, a network communication unit 310, a network connection unit 311, and a flash memory 312.

In the present exemplary embodiment, the description will be given of the printers 103, which are multifunction peripherals, as an example of a recording apparatus. However, a recording apparatus to which the present exemplary embodiment is applicable may be a recording apparatus other than a multifunction peripheral. An image recording apparatus, such as a copier or a facsimile, may be used, or a printer without a scanner function may be used. A recording apparatus according to the present exemplary embodiment will be described by taking a printer that performs recording using ink as an example, but may be an apparatus that uses a recording agent, such as toner.

The printer unit 301 of each of the printers 103 has a printing function. The scanner unit 302 has a scanner function, and the memory card attachment unit 303 and the memory card 304 each have a storage function. The printer unit 301 records (i.e., prints) an image on a recording medium, such as a printing sheet, by an inkjet method based on image data received from the outside or image data stored in the memory card 304. The printer unit 301 also manages amount-of-remaining-ink information and sheet information including information about the number of stacked sheets.

The scanner unit 302 optically reads a document set on a platen glass (not illustrated), converts the read document into electronic data, and transmits image data obtained by further converting the electronic data into a designated file format to an external device via a network or stores the image data in a storage area (not illustrated) in a hard disk drive (HDD) as an example. A copy function is realized by transferring image data generated by the scanner unit 302 reading a document placed on a platen glass to the printer unit 301 and then by the printer unit 301 recording an image on a recording medium based on the image data. Various kinds of file data are stored in the memory card 304 attached to the memory card attachment unit 303. The various kinds of file data can be read from an external device via a network and edited. Further, file data can be stored in the memory card 304 in response to an instruction from an external device.

The CPU 305 is a central processing unit for controlling the units in the printer 103.

The program memory 306 is a ROM or another type of memory, and stores various program codes and an application 314 for communicating with the printer management server 101. The application 314 includes a module having a function of generating printer status information (to be described below).

The work memory 307 is a RAM or another type of memory. The work memory 307 temporarily stores image data and other data in use of service, and buffering is performed using the work memory 307.

The display unit 308 includes, for example, an LCD that displays various kinds of information. The operation unit 309 includes, for example, switches for a user to perform various input operations.

The network communication unit 310 connects to the router 104 via the network connection unit 311. That is, the network communication unit 310 connects to networks, such as the Internet 100, via the network connection unit 311 to perform various types of communication. Various communications are controlled through HTTP or XMPP. The protocols are not limited to these, and in some embodiments, other protocols are used.

The flash memory 312 is a non-volatile memory for storing image data and other information received by the network communication unit 310.

The above-described units are connected to each other via a bus 313 to transmit and receive data to and from each other.

To the ink tank unit 315, an ink cartridge including an ink tank that stores ink used in the printer unit 301 is mounted. If toner is used as the recording agent, a toner cartridge can be mounted. When the ink cartridge mounted to the ink tank unit 315 runs out of ink or has an extremely small amount of remaining ink, a user replaces the ink cartridge with another. Further, with a print head integrated cartridge as the ink cartridge mounted to the ink tank unit 315, a user also replaces the ink cartridge with another if the print head has failed and cannot be used to perform printing. That is, the ink cartridge mounted to the ink tank unit 315 according to the present exemplary embodiment is a type of consumable item to be replaced with a replacement ink cartridge when the ink runs out or when the print head fails.

<Processing Up to Replacement Delivery of Ink Cartridge>

Figure 4:
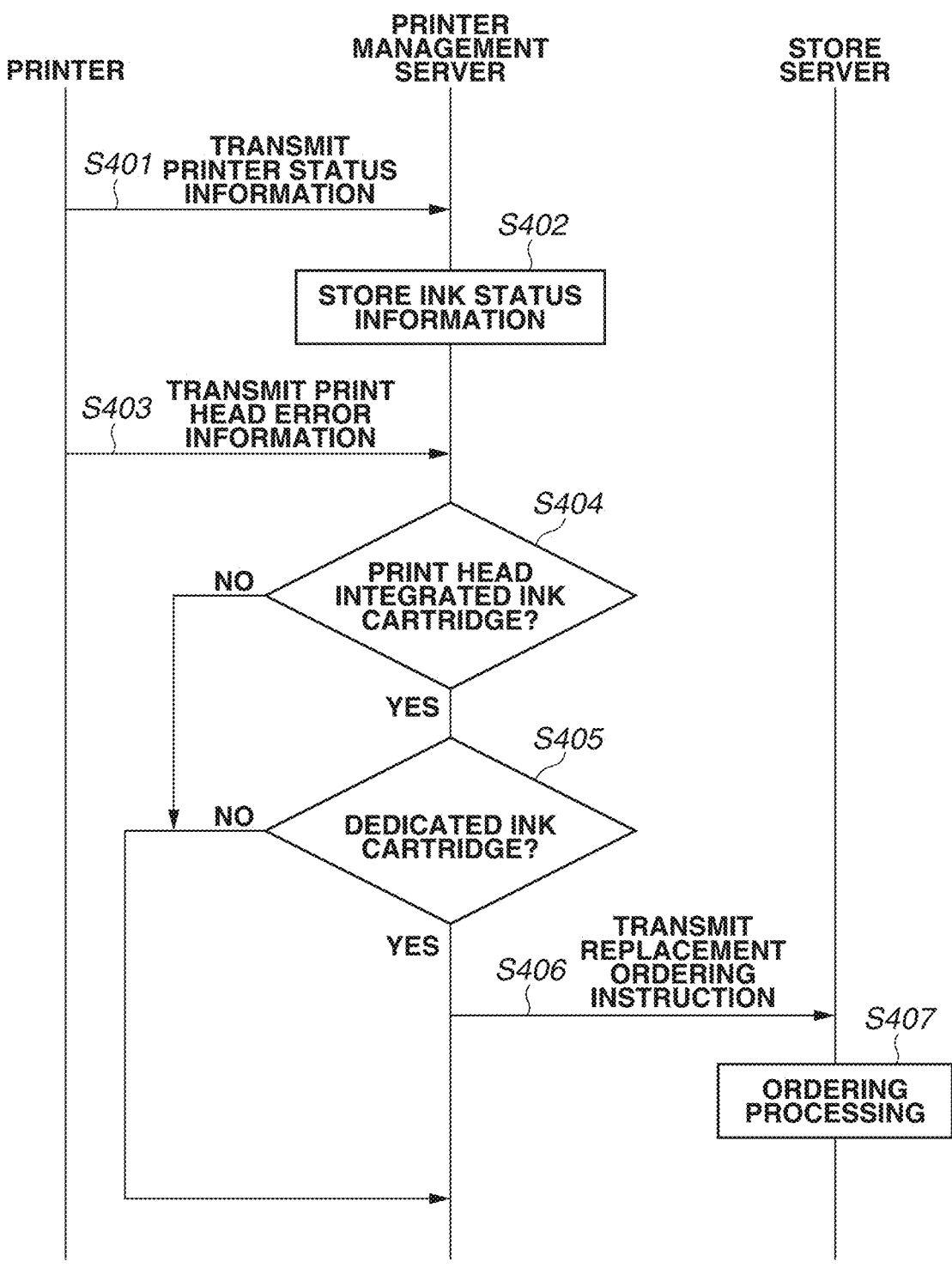
FIG. 4 is a sequence diagram related to processing up to the replacement delivery of an ink cartridge according to the present exemplary embodiment.

FIG. 4 is a diagram illustrating an example of a sequence related to processing up to the replacement delivery of an ink cartridge. Hereinafter, the processing up to the replacement delivery of an ink cartridge according to the present exemplary embodiment will be described with reference to FIG. 4 and other drawings. The series of pieces of processing illustrated in the sequence of FIG. 4 is performed by the CPUs of the printer(s) 103, the printer management server 101, and the store server 102 loading program codes stored in disk devices or another type of storage device into the RAM and running the program codes. In some embodiments, some or all of the functions of steps in FIG. 4 are carried out by a piece of hardware, such as an application-specific integrated circuit (ASIC) or electronic circuitry. The symbol "S" in the description of each piece of processing means step in the sequence diagram. The executors of each piece of processing are the CPUs of the printer(s) 103, the printer management server 101, and the store server 102.

In step S401, the printer 103 transmits printer status information (hereinafter referred to as "ink status information") including information about an ink cartridge to the printer management server 101. In the present exemplary embodiment, the ink status information is information including the cartridge shape that can be mounted to the printer 103, the ID (identification information) of each ink cartridge currently mounted, the color information, the type of cartridge, and amount-of-remaining-ink information, and the contents of the data are updated according to the usage status of ink. Here, a procedure in which the printer 103 transmits the ink status information to the printer management server 101 will be described with reference to FIG. 5.

Figure 5:
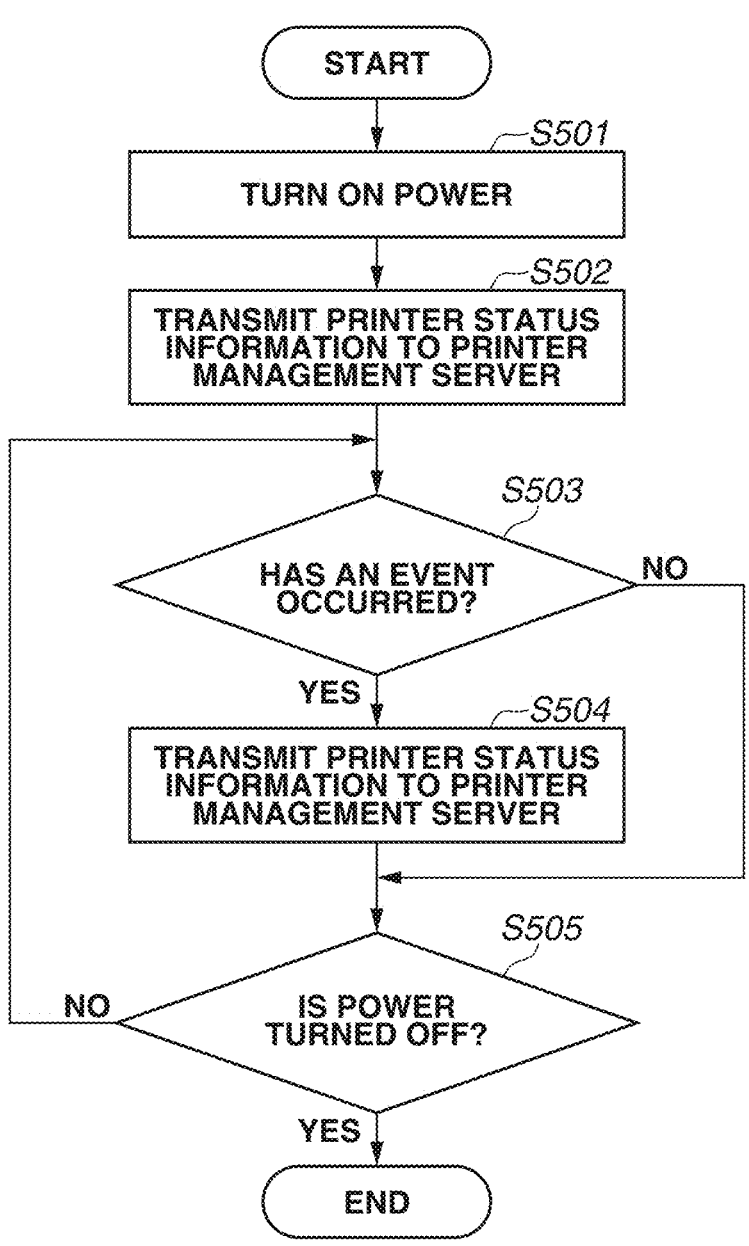
FIG. 5 is a flowchart illustrating an example of status information transmission processing according to the present exemplary embodiment.

FIG. 5 is a flowchart illustrating the procedure of processing in which the printer 103 transmits the ink status information including information about the ink cartridge to the printer management server 101. The series of pieces of processing illustrated in the flowchart of FIG. 5 is performed by the CPU 305 of the printer 103 loading program codes stored in the program memory 306 or another disk device into the RAM 202 and running the program codes. The printer 103 is in a power-off state before the series of pieces of processing illustrated in the flowchart of FIG. 5 is started. The processing of the flowchart is started when a power button of the printer 103 being pressed down is detected.

In step S501, the CPU 305 brings the printer 103 from the power-off state to the power-on state.

In step S502, the CPU 305 transmits to the printer management server 101 ink status information 600 as printer status information indicating the status of the printer 103. The printer status information will be described with reference to FIGS. 6A and 6B.

FIGS. 6A and 6B each illustrate an example of each piece of the printer status information transmitted to the printer management server 101 by the printer 103.

First, the ink status information 600 will be described with reference to FIG. 6A.

The ink status information 600 includes a serial number 601, a model name 602 of the printer 103, an ink shape 603 indicating the shape of the ink cartridge, and pieces of information 604 to 608 each for the corresponding ink cartridge of the individual ink cartridges, the number of the pieces of information 604 to 608 being equal to the number of the individual ink cartridges. The information about each ink cartridge includes a color 604, a model number 605, an amount of remaining ink 606, a unique ID (hereinafter referred to as an "ink cartridge ID") 607 for identifying the ink cartridge, and ink cartridge type information 608.

Hereinafter, each piece of information will be described in detail.

The ink shape 603 comes in two types: "print head integrated type", in which a print head is integrated with an ink cartridge, and "independent type", in which a print head and an ink cartridge are separate from each other, with the print head mounted to the main body of a printer. For example, the print head integrated type is denoted as "A", and the independent type is denoted as "B".

The ink cartridge ID 607 is identification information unique to a cartridge, regardless of the color of ink contained in the cartridge. For example, an ink cartridge to which "CRG00001" is assigned is uniquely specified in the consumable item ordering system.

The ink cartridge type information 608 comes in at least two types: "dedicated" and "commercially available". For example, the "dedicated" is denoted as "002", and the "commercially available" is denoted as "001". The type "dedicated" indicates an ink cartridge exclusively for the flat-rate print service. Hereinafter, an ink cartridge of the type "dedicated" is referred to as a dedicated ink cartridge (consumable item dedicated to the flat-rate print service). The printer 103 can perform flat-rate printing with a dedicated ink cartridge attached to the printer 103 in the use-under-contract state. Dedicated ink cartridges are supplied from the service provider to a user who has concluded the contract for the printer 103. The type "commercially available" is a commercially available ink cartridge that is purchasable from mass marketers of home appliances or mail-order sites. Hereinafter, an ink cartridge of the type "commercially available" is referred to as a commercially available ink cartridge. The printer 103 can perform printing with a commercially available cartridge attached to the printer 103 either in the normal use state or in the use-under-contract state.

Error status information 610 will be described with reference to FIG. 6B.

The error status information 610 includes an error code 611, an error status 612, and additional error information 613, all of which indicate an error occurring in the printer 103, in addition to the serial number 601 and the model name 602 of the printer 103. For example, if the print head with which an ink cartridge is integrated as a consumable item fails (hereinafter referred to as a "print head error"), the error code 611 is set to "xxx001" and the error status 612 is set to "head error". The additional error information 613 includes, for example, the ink cartridge ID that indicates the ink cartridge with the print head error.

The description will now return to the flowchart of FIG. 5.

In step S503, the CPU 305 determines whether an event has occurred. The event is an operation performed on the printer 103, such as printing or copying, or opening of a cover of the printer 103. If an event has occurred (YES in step S503), the CPU 305 advances the processing to step S504.

In step S504, the CPU 305 transmits the ink status information 600 to the printer management server 101, and advances the processing to step S505.

On the other hand, if no event occurs (NO in step S503), the CPU 305 advances the processing to step S505.

In step S505, the CPU 305 determines whether the power of the printer 103 is turned off. If the power of the printer 103 is not turned off (NO in step S505), the CPU 305 returns the processing to step S503 and repeats the processing from step S503.

On the other hand, if the power of the printer 103 is turned off (YES in step S505), the CPU 305 ends the processing of the flowchart.

As described above, in the present exemplary embodiment, the CPU 305 of the printer 103 transmits the ink status information 600 to the printer management server 101, for example, at the timing of the power being turned on or the timing of occurrence of an event, such as printing or copying. When an error occurs with the printer 103, the CPU 305 transmits the error status information 610 to the printer management server 101.

The description will now return to the sequence of FIG. 4.

In step S402, when the CPU 201 of the printer management server 101 receives the ink status information 600, the CPU 201 stores the received ink status information 600 in a printer management table 701 and an ink cartridge table 702 in the database 209. The database 209 will now be described with reference to FIGS. 7A and 7B.

FIGS. 7A and 7B are diagrams illustrating examples of various tables stored in the database 209 of the printer management server 101.

FIG. 7A illustrates the printer management table 701.

FIG. 7B illustrates the ink cartridge table 702.

The printer management table 701 is a table for managing the printers 103a and 103b, and stores the serial numbers, the contract information, and the ink shapes as illustrated in FIG. 7A.

Data is registered with the printer management table 701 in flat-rate service registration of the printers 103.

The ink cartridge table 702 is a table for managing ink cartridges, and stores ink cartridge IDs, cartridge types, and model number information about the ink cartridges, as illustrated in FIG. 7B.

The description will now return to the sequence of FIG. 4.

In step S403, when an error related to the print head occurs with the mounted ink cartridge, the CPU 305 of the printer 103 transmits the error status information 610 including the print head error information to the printer management server 101.

In step S404, when the CPU 201 of the printer management server 101 receives the error status information 610, the CPU 201 searches the data registered with the printer management table 701 for the printer serial number that matches the printer serial number included in the received error status information 610. If the corresponding data is present, the CPU 201 determines whether the ink shape indicates the "print head integrated type". If it is determined that the ink shape indicates the "print head integrated type" (YES in step S404), the CPU 201 advances the processing to step S405.

On the other hand, if the ink shape is an ink shape other than the "print head integrated type" or if no corresponding data is present (NO in step S404), the CPU 201 ends the processing.

In step S405, the CPU 201 searches the data registered with the ink cartridge table 702 for the ink cartridge ID that matches the ink cartridge ID included in the received error status information 610. If the corresponding data is present, the CPU 201 determines whether the ink cartridge type in the corresponding data is a dedicated ink cartridge. If it is determined that the ink cartridge type is a dedicated ink cartridge (YES in step S405), the CPU 201 checks the color information and advances the processing to step S406.

On the other hand, if the ink cartridge type is an ink cartridge other than a dedicated ink cartridge or no corresponding data is present (NO in step S405), the CPU 201 ends the processing.

In step S406, the CPU 201 transmits a replacement ordering instruction including the serial number of the printer 103 and the color information about the cartridge with the print head error (model number information, such as ABC-<CL> or ABC-<BK> in the example in FIG. 7B) to the store server 102.

In step S407, when the store server 102 receives the replacement ordering instruction from the printer management server 101, the store server 102 performs ordering processing based on the model number of the ink cartridge to be ordered and the printer serial number corresponding to the received replacement ordering instruction.

The store server 102 acquires the address of the user associated with the received printer serial number from a user management table 1001 described below, and performs ordering processing on a replacement ink cartridge. The user management table 1001 stored in the database 209 of the store server 102 according to the present exemplary embodiment will be described with reference to FIG. 10.

<User Management Table>

FIG. 10 is a diagram illustrating an example of the user management table 1001.

The user management table 1001 stores information involved in a service contract for ink management and other operations performed by the printer management server 101 after a user purchases the printer 103. Specifically, the serial number as the identifier of the printer 103 under the contract is stored in the user management table 1001 in association with the ID, the address, and the mail address of the user as the subscriber.

Effects of Present Exemplary Embodiment

According to the present exemplary embodiment, a replacement can be ordered even if a consumable item fails. That is, even if a print head fails, an order can be automatically placed. This allows placement of a replacement even if the print head fails and gets unable to print before the amount of remaining ink of an ink cartridge is equal to or lower than a threshold.

In the above-described example, while the printer management server 101 performs the replacement ordering instruction processing for an ink cartridge, the present exemplary embodiment is not limited to such an example. For example, the printer(s) 103 can perform replacement ordering determination processing for an ink cartridge and then transmit an ordering instruction to the store server 102. In the present exemplary embodiment, while the printer management server 101 itself stores the printer management table 701 and the ink cartridge table 702, the present disclosure is not limited to this. The printer management server 101 can manage an external table by reading and updating the external table stored in an external device.

In the present exemplary embodiment, while ink cartridges are ordered, the present disclosure is not limited to ink cartridges. If the recording agent accommodated in a cartridge as a consumable item is toner, toner cartridges can be ordered.

In a second exemplary embodiment, a form will be described in which the printer management server 101 determines whether to issue an ordering instruction for a replacement at the time of occurrence of a print head error. In the present exemplary embodiment, the description of the content common to that in the first exemplary embodiment will be omitted as appropriate, and differences from the first exemplary embodiment will be mainly described.

FIG. 9 is a diagram illustrating an example of an ink cartridge ordering management table 900 stored in the database 209 of the printer management server 101.

The ink cartridge ordering management table 900 is a table for managing the ordering state of an ink cartridge. The ink cartridge ordering management table 900 stores the ink cartridge ID of, the model number of, the amount of remaining ink of, print head error occurrence information about, and replacement ordering information about the ink cartridge for which a replacement has been ordered, in association with each other. The print head error occurrence information indicates the occurrence state of a print head error. For example, "-" indicated in the print head error occurrence information means that no print head error occurs, and "occurred" indicated in the print head error occurrence information means that a print head error occurs. In the case of an ink cartridge without a print head (independent type ink cartridge), the print head error occurrence information indicates "-".

Figure 8:
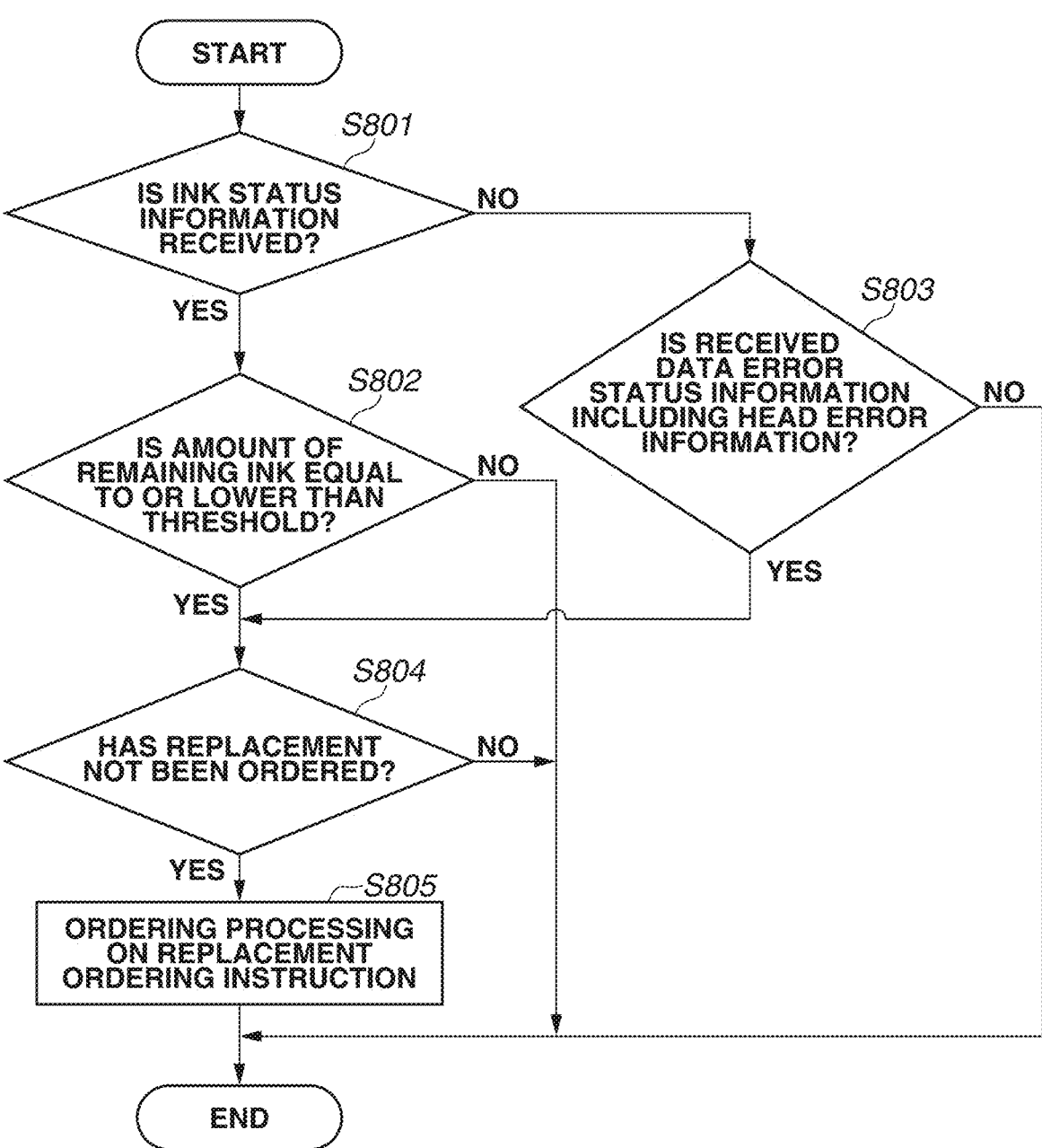
FIG. 8 is a flowchart illustrating an example of consumable item ordering instruction transmission processing according to a second exemplary embodiment.

FIG. 8 is a flowchart illustrating a procedure of processing until the printer management server 101 issues an ordering instruction for a replacement ink cartridge to the store server 102.

Further, the processing in each step in FIG. 8 is performed by the CPU 201 of the printer management server 101 loading program codes stored in the ROM 203 or the storage device 204 into the RAM 202 and running the program codes. The processing of the flowchart starts when the printer management server 101 receives data from the printer(s) 103.

In step S801, the CPU 201 determines whether the data received from the printer 103 is the ink status information 600. If the data received from the printer 103 is the ink status information 600 (YES in step S801), the CPU 201 advances the processing to step S802.

In step S802, the CPU 201 determines whether the amount of remaining ink included in the ink status information 600 received in step S801 is equal to or lower than a predetermined threshold. The predetermined threshold is any value, such as 0, 10, or 20, indicating the percentage of the amount of remaining ink.

Here, if the amount of remaining ink is not equal to or lower than the predetermined threshold (NO in step S802), the CPU 201 ends the processing of the flowchart.

On the other hand, if the amount of remaining ink is equal to or lower than the predetermined threshold (YES in step S802), the CPU 201 searches the data registered with the ink cartridge ordering management table 900 for the ink cartridge ID that matches the ink cartridge ID included in the received ink status information 600. If the corresponding data is present, the CPU 201 updates the amount-of-remaining-ink information in the ink cartridge ordering management table 900. If no corresponding data is present, the ink cartridge ID, the ink cartridge model number, and the amount-of-remaining-ink information are associated with each other and registered with the ink cartridge ordering management table 900. At this time, the print head error occurrence information is registered as "-", and the replacement delivery is registered as "not yet". Subsequently, the CPU 201 advances the processing to step S804.

In addition, if the data received from the printer 103 is not the ink status information 600 in step S801 (NO in step S801), the CPU 201 advances the processing to step S803.

In step S803, the CPU 201 determines whether the data received from the printer 103 is the error status information 610 that includes print head error information. If the error status information 610 does not include print head error information (NO in step S803), the CPU 201 ends the processing of the flowchart.

On the other hand, if the received data is the error status information 610 including print head error information (YES in step S803), the CPU 201 searches the data registered with the ink cartridge ordering management table 900 for the ink cartridge ID that matches the ink cartridge ID included in the received error status information 610. If the corresponding data is present, the CPU 201 updates the print head error occurrence information in the ink cartridge ordering management table 900 to "occurred". If no corresponding data is present, the CPU 201 registers the ink cartridge ID and the print head error occurrence information with the ink cartridge ordering management table 900. At this time, the amount-of-remaining-ink information is registered as "-", and the replacement delivery is registered as "not yet". Subsequently, the CPU 201 advances the processing to step S804.

In step S804, the CPU 201 searches the data registered with the ink cartridge ordering management table 900 for the ink cartridge ID of which the ink cartridge is determined to have an amount of remaining ink that is equal to or lower than the threshold in step S802, or the ink cartridge ID that matches the ink cartridge ID of the ink cartridge with the print head error in step S803. Replacement ordering information about the matched ink cartridge ID is checked, and it is determined whether the replacement has not been ordered yet. Here, if the replacement delivery in the ink cartridge ordering management table 900 indicates "not yet", it is determined that the replacement has not been ordered yet (YES in step S804), and the CPU 201 advances the processing to step S805. The processing of step S805 is similar to that in step S407 in FIG. 4, and thus the description thereof will be omitted.

On the other hand, if the replacement delivery in the ink cartridge ordering management table 900 indicates "done", it is determined that the replacement has been ordered (NO in step S804), and the CPU 201 ends the processing of the flowchart.

Although not illustrated in the flowchart of FIG. 8, even if a print head error is received from a printer as the transmission source of the error, the printer being designed for an ink cartridge without a print head (i.e., an independent type ink cartridge), processing for delivery of a replacement of the ink cartridge is not performed.

Effects of Present Exemplary Embodiment

According to the present exemplary embodiment, an ordering processing on another replacement after a replacement has been ordered before a print head error occurs is prevented. This prevents the user from having extra stock.

According to each of the exemplary embodiments described above, a replacement can be ordered even if the print head integrated with an ink cartridge fails before the amount of remaining recording agent in the consumable item (ink cartridge) is equal to or lower than a threshold.

Further, the present disclosure is not limited to the configurations and details of the various data described above. It goes without saying that various configurations and details of data can be employed depending on the application and the purpose.

While the exemplary embodiments have been described above, the present disclosure can be implemented by taking, for example, a system, an apparatus, a method, a program, or a storage media as an embodiment. Specifically, the present disclosure may be applied to a system including a plurality of devices or a single device.

Further, all configurations obtained by combining the above-described exemplary embodiments are also included in the present disclosure.

OTHER EMBODIMENTS

The present disclosure can also be implemented by processing in which a program for carrying out one or more functions of the above-described exemplary embodiments is supplied to a system or an apparatus via a network or a storage media, and one or more processors in a computer of the system or the apparatus read and run the program. The present disclosure can also be realized with circuitry (for example, ASIC) that carries out one or more functions.

The present disclosure may be applied to a system including a plurality of devices or a single device.

The present disclosure is not limited to the above-described exemplary embodiments, and various modifications (including organic combinations of the exemplary embodiments) can be made based on the spirit of the present disclosure, and these modifications are not excluded from the scope of the present disclosure. That is, all configurations obtained by combining the above-described exemplary embodiments and modifications thereof are also included in the present disclosure.

According to the present disclosure, a replacement can be ordered even if the print head integrated with an ink cartridge fails before the amount of remaining ink in the ink cartridge is equal to or lower than a threshold.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-076459, filed May 8, 2023, which is hereby incorporated by reference herein in its entirety.

What is claimed is:

1. A system comprising:
   a printer to which an ink cartridge integrated with a print head is attached; and
   a printer management server,
   wherein the printer is configured to:
      transmit status information including an ink cartridge identifier and an ink cartridge type of the attached ink cartridge to the printer management server; and
      issue, when a print head error with the attached ink cartridge occurs, a notification about the print head error including the ink cartridge identifier to the printer management server,
   wherein the printer management server includes:
      a storage;
      one or more memories storing instructions, and
      one or more processors capable of executing the instructions causing the management server to:
         store, when the printer management server receives the status information from the printer, a printer identifier, the ink cartridge identifier, and the ink cartridge type in association with each other in the storage;
         determine, when the printer management server receives the notification about the print head error from the printer, the ink cartridge type based on the ink cartridge identifier included in the notification and the storage; and
         execute, in a case where the ink cartridge with which the print head error has occurred is an ink cartridge integrated with a print head under a predetermined contract, processing for delivering a replacement of the ink cartridge.

2. The system according to claim 1, wherein, in a case where the ink cartridge with which the print head error has occurred is an ink cartridge integrated with a print head under the predetermined contract, the processing for delivering the replacement of the ink cartridge is executed regardless of an amount of remaining ink of the ink cartridge.

3. The system according to claim 1, further comprising a second printer to which an ink cartridge not including a print head is attached,
   wherein processing for delivering a replacement of an ink cartridge for the second printer is not executed in a case where the printer management server receives a notification about a print head error from the second printer.

4. The system according to claim 1, wherein the predetermined contract is a contract in which an ink cartridge under the predetermined contract is automatically delivered in response to when an amount of remaining ink in an ink cartridge under the predetermined contract becomes equal to or lower than a threshold.

5. A management server configured to communicate with a printer to which an ink cartridge integrated with a print head is attached, the management server comprising:

a storage;

one or more memories storing instructions, and one or more processors capable of executing the instructions causing the management server to:

store, when the management server receives status information including an ink cartridge identifier and an ink cartridge type of the ink cartridge attached to the printer from the printer, a printer identifier, the ink cartridge identifier, and the ink cartridge type in association with each other in the storage;

determine, when the management server receives a notification about a print head error including the ink cartridge identifier of the ink cartridge with which the print head error has occurred from the printer, the ink cartridge type based on the ink cartridge identifier included in the notification and the storage; and execute, in a case where the ink cartridge with which the print head error has occurred is an ink cartridge integrated with a print head under a predetermined contract, processing for delivering a replacement of the ink cartridge.

6. The management server according to claim 5, wherein the processing for delivering the replacement of the ink cartridge is executed regardless of an amount of remaining ink in a case where the ink cartridge with which the print head error has occurred is an ink cartridge integrated with a print head under the predetermined contract.

7. The management server according to claim 5, wherein the management server is configured to communicate with a second printer to which an ink cartridge not including a print head is attached, and wherein processing for delivering a replacement of an ink cartridge for the second printer is not executed in a case where the management server receives a notification about a print head error from the second printer.

8. The management server according to claim 5, wherein the predetermined contract is a contract in which an ink cartridge under the predetermined contract is automatically delivered in response to when an amount of remaining ink in an ink cartridge under the predetermined contract becomes equal to or lower than a threshold.

9. A method for controlling a management server configured to communicate with a printer to which an ink cartridge integrated with a print head is attached, the method comprising:

registering, when the management server receives status information including an ink cartridge identifier and an ink cartridge type of the ink cartridge attached to the printer from the printer, a printer identifier, the ink cartridge identifier, and the ink cartridge type in association with each other with a storage unit;

determining, in a case where the management server receives a notification about a print head error including the ink cartridge identifier of the ink cartridge with which the print head error has occurred from the printer, the ink cartridge type based on the ink cartridge identifier included in the notification and the storage unit; and executing processing for delivering a replacement of the ink cartridge with which the print head error has occurred, in a case where the ink cartridge with which the print head error has occurred is an ink cartridge integrated with a print head under a predetermined contract.

* * * * *